Figure 1:
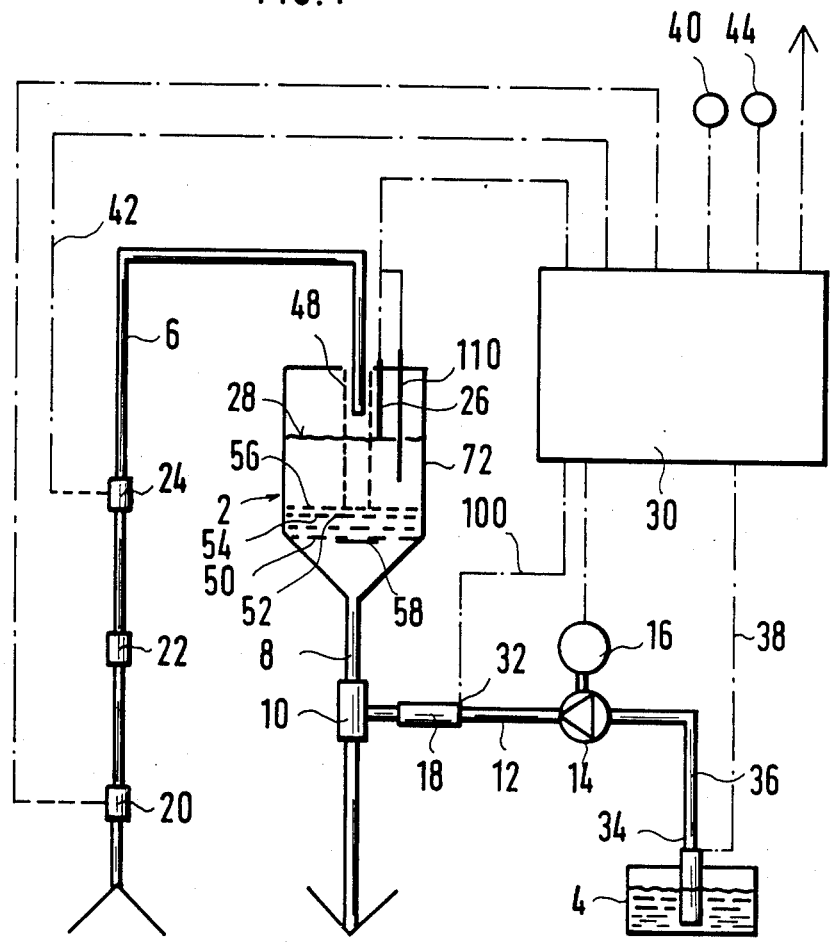

United States Patent [19]
Weber

[11] Patent Number: 4,610,848
[45] Date of Patent: Sep. 9, 1986

[54] DEVICE FOR THE DOSABLE ADDITION OF A SUBSTANCE TO A SOLVENT

[75] Inventor: Klaus Weber, Hildesheim, Fed. Rep. of Germany

[73] Assignee: Weber und Springmann, Fed. Rep. of Germany

[21] Appl. No.: 665,300

[22] Filed: Oct. 26, 1984

[30] Foreign Application Priority Data

Oct. 29, 1983 [DE] Fed. Rep. of Germany ....... 3339420

[51] Int. Cl.$^4$ .............................................. G05D 9/00
[52] U.S. Cl. .................................... 422/106; 210/104; 210/198.1
[58] Field of Search .................. 422/106; 210/97, 104, 210/198.1, 200, 201, 202, 205

[56] References Cited

U.S. PATENT DOCUMENTS 3,123,445  3/1964  Heath ................................. 422/106

Primary Examiner—Frank Sever
Attorney, Agent, or Firm—Allegretti, Newitt, Witcoff & McAndrews, Ltd.

[57] ABSTRACT

A device for the dosable addition of accurate quantities of liquid disinfecting agent to water, having a reservoir for the water, and a supply container for the disinfectant. A dosing pump feeds the disinfectant in regulatable amounts from supply container to the water flowing from the reservoir. In order to reduce constructional costs and to increase the dosing accuracy, the water reservoir has a liquid level-control device and an outlet line. The quantity of the outflowing water is controlled accurately solely by the existing static pressure of the water level in the reservoir. The fluctuation in dosing is less than 2%.

29 Claims, 7 Drawing Figures

DEVICE FOR THE DOSABLE ADDITION OF A SUBSTANCE TO A SOLVENT

The invention concerns a device for the accurate dosable addition of a substance to a solvent or thinner.

Dosing devices are known in which a substance, e.g., a disenfecting agent, is added to a container with a solvent, usually water. The disinfectant solution is thus produced in a container and taken from the container as needed by means of a pump. This known device is relatively expensive.

Another dosing device is known in which a component with water flowing through it converts a part of the water pressure energy into kinetic energy which is used to drive a pump which feeds a disinfecting agent without pressure into a water stream. This known dosing device is expensive from a construction point of view, and is necessarily associated with a loss of water pressure which leads to a considerably reduced rate of flow as the water pressure is reduced.

In both known dosing devices there is basically a rigid connection between water flow and addition of the disinfectant. Because of the varying pump seed due to the change in the water flow rate, a relatively great dosing inaccuracy results, which in the known devices amounts to something like 15% to 20%. This leads to a relatively high consumption of disinfectant.

The object of the present invention, therefore, consists in providing a device of the type in question characterized by low constructional cost and enhanced dosing accuracy.

According to the invention, a level-control device is provided for the setting of a predetermined level of the solvent in the reservoir. Also provided is an outlet line through which the solvent leaves the reservoir only under the force of gravity. The apparatus according to the invention has the advantage that the outflow rate of the solvent, which is mostly water, is determined by the particular regulated static pressure and the friction resistance of the outlet line, which can be considered as a constant. This produces a fluctuation in the accuracy of the outflow volume or of the dosing of less than 1%.

In an especially advantageous form of the invention, the feed line for the dosing substance which is to be added to the solvent flowing out of the reservoir connects directly to the outlet line. Hence, only fresh solutions are produced, whereby contamination is practically completely avoided.

By means of the further refinements in the invention, disadvantageous flow conditions in the reservoir are eliminated, air bubbles are caught on porous components, and the energy introduced by the inflowing solvent is dissipated.

The pump used for dosing is preferably a tube pump which functions very accurately. The fluctuations in the conveyance of the liquid are under 1%, and the expected fluctuations in the dosing are under 2%, if the air is prevented from getting into the suction line and hence into the pump. The feed rate is determined by the change in the draw of the pump.

Various safety devices are provided for detecting irregularities and for shutting down the device if necessary, as explained in the detailed description.

Figure 2:
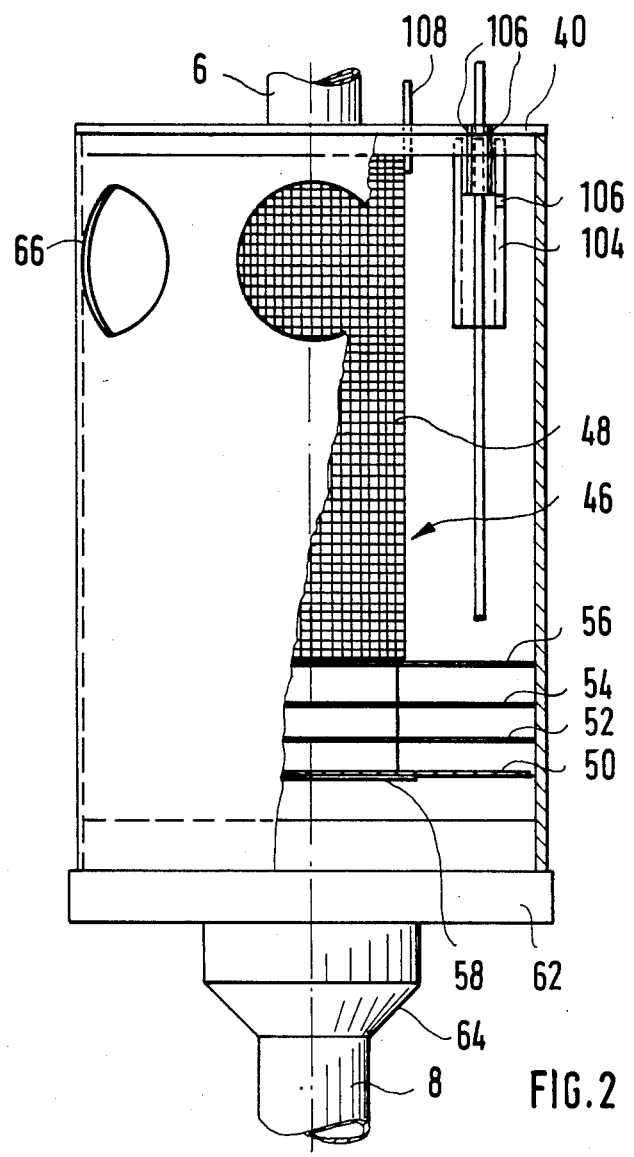
Figure 3:
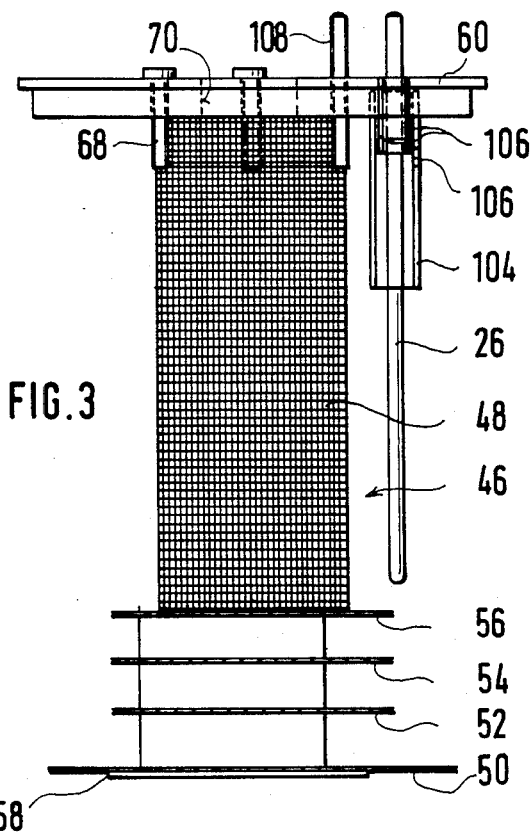
Figure 4:
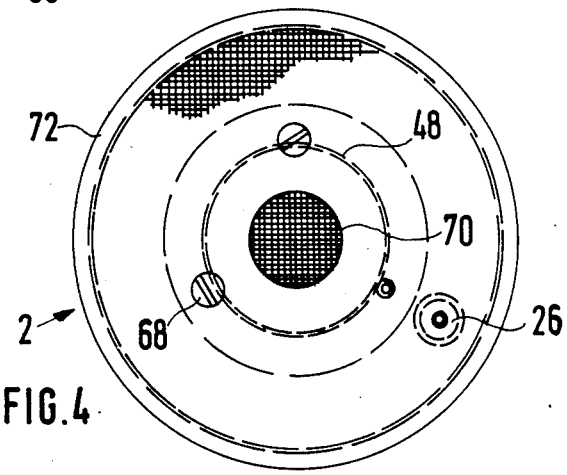
Figure 5:
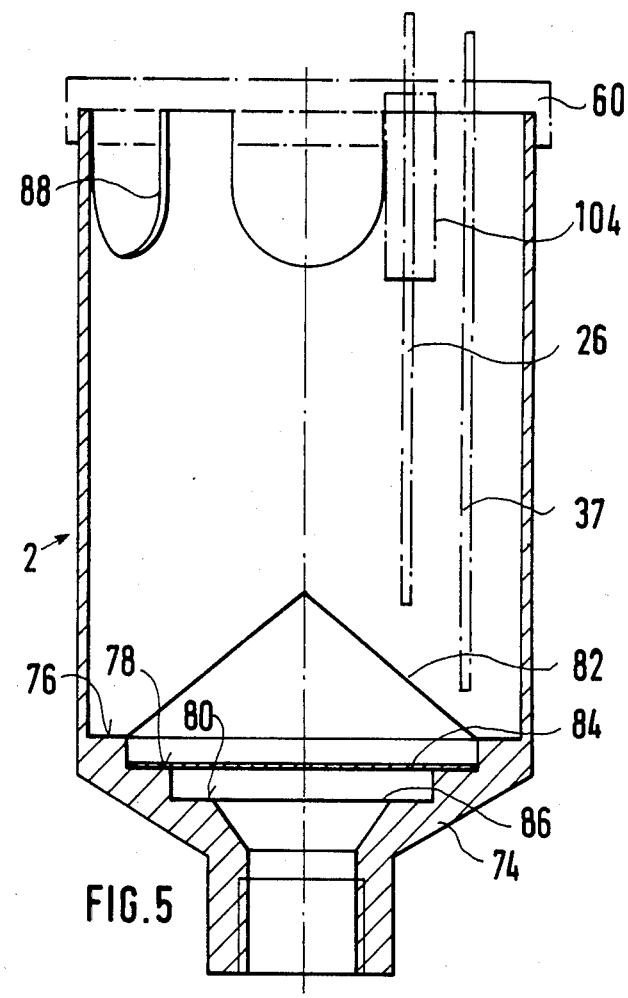
Figure 6:
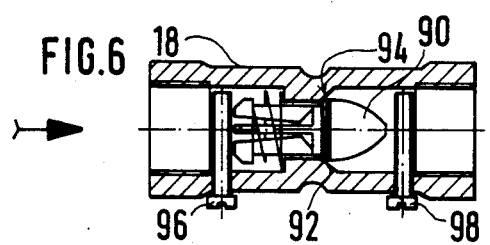
Figure 7:
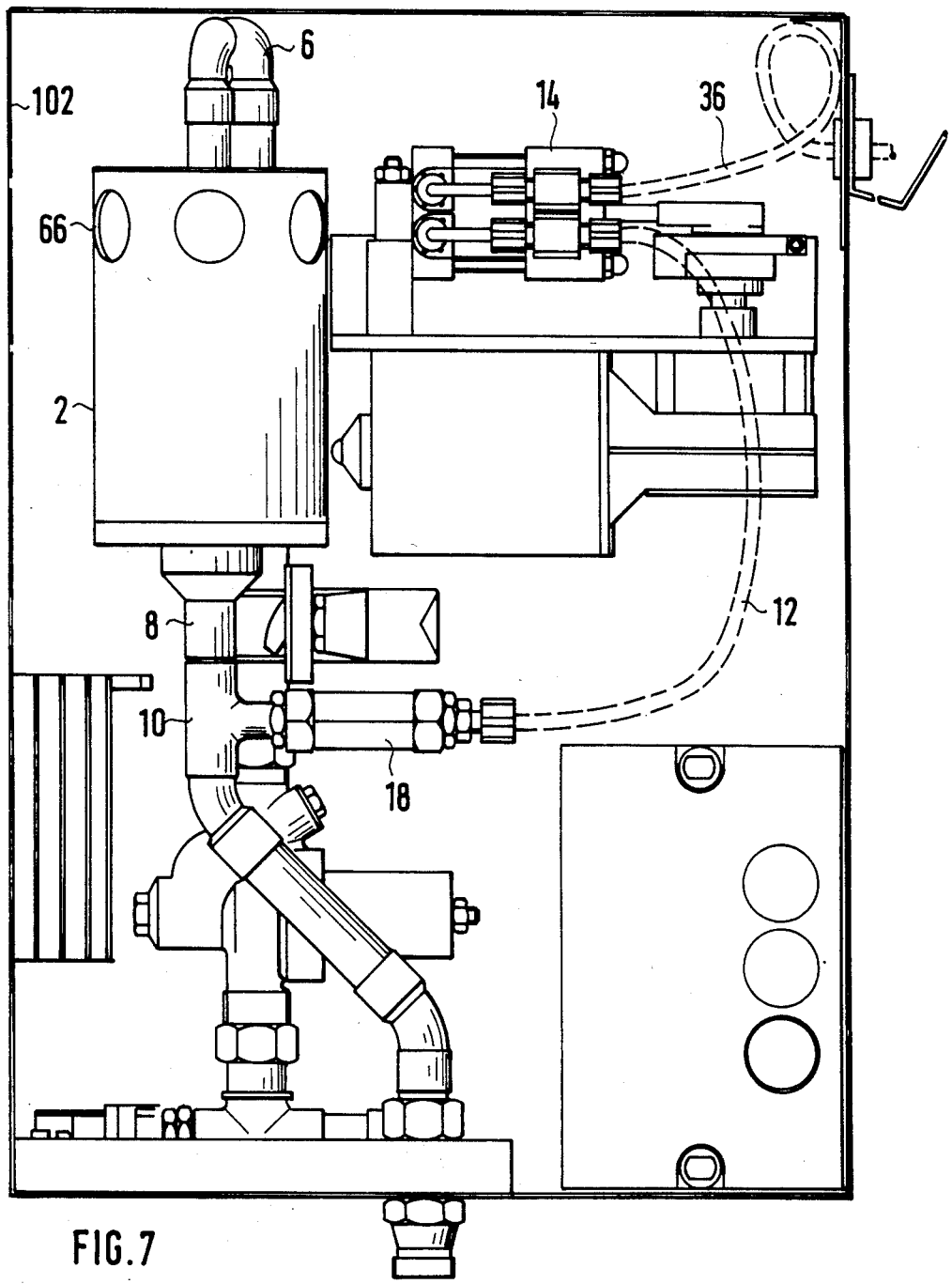

The invention will now be explained in more detail in conjunction with the attached drawings, in which FIG. 1 is an operational diagram of the device according to the invention, FIG. 2 is a partly broken away view of a reservoir for solvent used in the device, FIG. 3 is a more detailed representation of a filter insert for the reservoir of FIG. 2, FIG. 4 is a top view of the assembly of FIG. 3, FIG. 5 is a longitudinal cross-section through a modification of the reservoir for the solvent, FIG. 6 is a sectional view through a check-valve used in the feed line for dosing substance, with built-in dosing substance monitoring device, and FIG. 7 is a side elevational assembly view of a commercial embodiment of the device according to the invention.

The drawings shown a device for the dosable addition of a substance to a solvent or thinner, in this case the substance being a disinfecting agent and the solvent or thinner, water. The device has a reservoir 2 for water and a supply container 4 for the disinfectant. A supply line 6 is disposed in the center of the reservoir for feeding water continuously or intermittently into the reservoir 2. A vertical outlet line 8 connects to the bottom of the reservoir and has a T-fitting to which a feed line 12 for the disinfectant is connected. A dosing pump 14 with a motor 16 and a check-valve 18 is located in the feed line 12.

A pressure switch 20, a pressure regulator 22 and a solenoid valve 24 are located in the water supply line.

The reservoir 2 is equipped with a sensor probe 26 for regulating the level 28 of the water in the reservoir. By means of this sensor 26, whose output signals are evaluated in an electronic unit 30, the solenoid valve 24 is controlled so that the level 28 is maintained at a predetermined value.

A disinfectant flow-monitoring device 32 is incorporated into the check-valve 18 in feed line 12. Also in the feed line, on the suction side 36 of the dosing pump, there is a level sensor 34.

At the lower end of the suction line 36, a foot-valve (not shown) is provided that closes off the suction line when the supply container 4 is being changed, and prevents the entry of air into the suction line.

In the reservoir 2 there is also a level monitoring device 37 (see FIG. 5) that monitors a minimum level and automatically shuts off the device if the level goes below this minimum.

The disinfectant flow monitoring device 32 monitors the presence of the disinfectant in the feed line. The monitoring is done with test pulses whose temporal sequence is monitored. If such a test pulse does not occur within a predetermined time, e.g., six seconds, the device is automatically switched off through the electronic unit 30.

The level monitoring device 34 monitors the disinfectant level in the canister 4 and emits a signal over a line 38 to the electronic unit 30 if the level falls below the minimum. This condition is indicated by telltale light 40 which is also activated when the disinfectant flow monitoring device calls for replenishment.

In the electronic unit 30, furthermore, the control pulse continuity of the solenoid valve 24, which is controlled through a circuit 42, is monitored. If the switching pulse for the solenoid valve 24 is absent for longer than a predetermined time, e.g., seven seconds, the device is shut off and an indicator signal 44 is simultaneously activated.

The pressure switch 20 monitors the water pressure and shuts the device off if it goes below a predetermined level, e.g., 0.8 bar. This irregularity also is indicated visually.

A given pressure of the water in the supply line 6 is maintained by means of the pressure regulator 22.

The dosing pump 14 is a motor-driven pump of any kind, preferably a tube pump driven by a step motor.

A filter assembly 40, FIG. 2, is installed in the reservoir 2 to prevent stream turbulence and the entry of air bubbles into the water flowing out through the outlet line 8. This consists of a vertically positioned cylinder 48 with a perforated wall or of a latticed material. The supply line 6 projects down into this cylinder more or less coaxially. Underneath this cylinder are located several horizontal filters 50–56 with spaces between them. Filter 50 for the distribution of the flow, is fitted with a baffle plate 58 installed centrally and having a diameter equal to or greater than the inside diameter of the cylinder 48. In FIG. 2 this baffle plate is installed on the bottom filter insert 50. This baffle plate, alternatively, can also be fastened to one of the other filters.

The reservoir 2 is provided with a top 60 and a bottom 62 which is equipped with a funnel-shaped outlet connection 64. The reservoir itself is preferably cylindrical and is provided with wall perforations 66 above the water level surface 28.

FIG. 3 shows the filter insert 46 together with the top of the reservoir 2 by themselves. The cylinder 48 is attached to the underside of the top 60 with fastening means 68.

FIG. 4 is a view looking down on the top. Seen are a central opening 70 for the supply pipe 6 of the filter cylinder 48 and the cylindrical wall 72 of the reservoir; also the level sensor 26 and the fastening means 68 of the cylinder 48.

FIG. 5 shows another embodiment of the reservoir 2 according to the invention. The bottom 74 of this reservoir is funnel-shaped and has on its inside circular steps 76, 78, and 80. On these steps rest filters 82, 84 and 86. The top filter 82 is cone-shaped. The filters are either laid upon the steps or fastened to them. Although in the embodiment of FIG. 5 the vertical filter cylinder 48 of FIGS. 1-4 is missing, one can, of course, also be provided in the FIG. 5 embodiment. The reservoir of FIG. 5 is also provided with wall perforations 88 on the upper edge, which, of course, must be located above the liquid level that is to be established. FIG. 6 shows in detail the check-valve 18 indicated in FIG. 1. The valve has, as usual, a closure element 90 pretensioned against the direction of flow, and a cooperating valve seat 92. Element 90 and valve seat 92 in body 18 constitute a valve 94. On either side of the valve 94 are electrodes 96 and 98, which are a part of the disinfectant flow monitoring device described in connection with FIG. 1. By means of these electrodes, the conductance of the disinfectant flowing in the feed line 12 is measured and monitored. The electrodes are powered through leads 100 (see FIG. 1) which connect to electronic control unit 30. An interruption of the disinfectant flow causes a change in conductance which is detected in the electronic unit 30 and leads to the shutting off of the device and a signaling of the defect.

FIG. 7 shows the device in an industrial version in a housing 102. Apart from this, reference can be made to the description of FIGS. 1-6 with respect to the individual components.

The device shown in FIGS. 1-7 operates as follows: through the supply line 6, water is fed constantly, or with the use of a solenoid valve intermittently to the reservoir 2. The water level 28 is monitored by means of the sensor 26, and the electronic unit 30, and the solenoid valve 24, adjusted to a predetermined value. The water in the reservoir 2 flows downward through the outlet line 8 with the rate of flow being determined only by the static pressure and the friction conditions in the outlet line 8. By means of the dosing pump 14, the disinfectant is added constantly or in portions from the supply canister 4 to the water flowing out through line 8, the dosing amount being adjustable through control of the motor 16 or of the stroke of the pump 14.

As shown in the drawing, the admixture of the disinfectant takes place in the outlet line 8, but it can also take place in the reservoir, by having the feed line 12 lead into the cylindrical wall 72 of the reservoir 2.

Instead of the described pressure regulator 22, a flow rate limiter or a flow rate regulator can be used in the supply line.

As a sensor for the probing and regulation of the level in the reservoir 2, a measuring probe 26 is preferably used, around which a protective tube 104 (FIG. 2) is installed as a splash guard and to prevent creepage from the water films. In order to prevent water of condensation from forming under the protection tube 104, which would form a disadvantageous water film, perforations 106 are provided between the protective tube 104 and the measuring probe 26 and/or in the tube casing on the side away from the water feed or the cylinder 46 in order to create a circulation of air.

The cylinder 48 can be made of a metal. In this case it serves usefully as a ground electrode which has a connection 108 for the measuring probe 26, see FIG. 2. If the cylinder 48 consists of a non-conductive material, a separate ground electrode 110 (see FIG. 1) is provided. In this case, the above-mentioned protective tube 104 surrounds both electrodes (ground electrode 110 and measuring probe 26). However, a protection screen (not shown) can also be provided which is located between the two electrodes 110 and 26 of the cylinder 48.

The check-valve 18 consists wholly of an electrically non-conducting material, e.g., plastic. When the valve is closed by the valve element 90, the conductance (electrolytic conductance) between the electrodes 96 and 98 is interrupted, which happens, e.g., in the case of a jammed or sticking valve element 90 or the failure of the dosing pump 14.

The pump 14 can be a simple and moderately priced gear pump. In order to be able to achieve the necessary accuracy, an adjustable diaphragm or an adjustable nozzle may be incorporated in the line 12 to increase the pressure.

I claim:
1. A device for the addition of a liquid dosing substance to a solvent comprising
    a reservoir for the solvent
    an outlet line connected to said reservoir
    means for controlling the quantity of solvent discharged from said outlet line which means is responsive solely to the static pressure of the solvent in the reservoir and includes a level control device mounted in said reservoir
    a supply container for the dosing substance
    a feed line connecting from said supply container to said outlet line, and
    a dosing pump in said feed line.
2. The device of claim 1 which includes a solvent supply line connecting to said reservoir, which line has a valve controlled by said level-control device.

3. The device of claim 1 in which said dosing pump is a motor-driven tubing pump.

4. The device of claim 3 in which said pump motor is a step motor.

5. The device of claim 2 in which said level-control device has a sensor that probes the surface of the liquid in the reservoir and emits signals which control said solenoid valve.

6. The device of claim 5 in which said sensor is a measuring probe, the upper part of which is enclosed in a splash protection tube.

7. The device of claim 6 in which said tube is perforated for the creation of air circulation to prevent water condensation.

8. The device of claim 5 which includes a ground electrode probing the surface of the liquid in the reservoir, a protective tube surrounding said electrode and said probe, and a protective screen interposed between said tube and a solvent supply line leading to the center of said reservoir.

9. The device of claim 2 which includes safety means for the measurement and monitoring of the reservoir level, of the supply container level, of the feed of the dosing substance, of the feed of the solvent, and the pressure of the solvent in the supply line.

10. The device of claim 9 in which the safety means for the measurement and monitoring of the dosing substance feed measures the electrical conductivity of the dosing substance and produces an output signal, and includes means for comparing said signal with a nominal value and for cutting off said dosing pump if the nominal value is exceeded.

11. The device of claim 10 in which said output signal comprises test impulses produced at predetermined intervals of time and in whose absence said cut-off occurs.

12. The device of claim 10 which includes a check valve in said feed line, and in which said safety means has two electrodes in the conductivity circuit arranged one on either side of said check valve.

13. The device of claim 12 in which said check valve and its components consist of an electrically non-conducting material.

14. The device of claim 9 in which said safety means for the monitoring of the level in the reservoir comprises a shortage indicator which emits a cut-off signal if the level goes below a predetermined minimum.

15. The device of claim 9 in which said safety means for the measurement and monitoring of the level in the supply container produces an indicator and cut-off signal if the level goes below a predetermined minimum.

16. The device of claim 9 in which said safety means for the measurement and monitoring of the feed of the solvent includes means for monitoring the temporal sequence of a solenoid controlling said valve in said solvent supply line, and in the absence of switching signals over a predetermined time actuates an indicator and cut-off circuit.

17. The device of claim 9 in which said safety means for the monitoring of the pressure of the solvent includes a pressure switch located in the solvent supply line which actuates an indicator and cut-off signal below a predetermined pressure.

18. The device of claim 2 which includes in the solvent supply line a pressure regulator for the setting of a predetermined pressure.

19. The device of claim 1 in which said feed line also contains a check-valve between said dosing pump and said outlet line.

20. The device of claim 1 which includes a solvent supply line leading into the center of said reservoir.

21. The device of claim 20 which includes an upright porous cylinder located in the reservoir and extending below the liquid level, said supply line opening into said cylinder.

22. The device of claim 21 which includes a screen disposed beneath said supply line.

23. The device of claim 22 which includes a plurality of said screens vertically spaced from each other.

24. The device of claim 22 which includes a baffle plate located in line with the opening of the supply line, the diameter of which is equal to or greater than the inside diameter of the supply line.

25. The device of claim 22 in which said screen is conical.

26. The device of claim 22 in which said screen is connected to the bottom open end of said cylinder.

27. The device of claim 1 in which said screen is disc-shaped.

28. The device of claim 21 in which said level control device has an electrode probe dipping into the liquid in said reservoir and said cylinder is metal and connects to said probe as a ground electrode.

29. The device of claim 1 in which said reservoir is a cylindrical hollow body whose lower end is funnel-shaped.

* * * * *